US009015170B2

(12) United States Patent
Xu et al.

(10) Patent No.: US 9,015,170 B2
(45) Date of Patent: Apr. 21, 2015

(54) ENTROPY-BASED MIXING AND PERSONALIZATION

(71) Applicant: Yahoo! Inc., Sunnyvale, CA (US)

(72) Inventors: Zhichen Xu, San Jose, CA (US);
Aurora Skarra-Gallagher, Santa Cruz, CA (US); Neal Sample, Santa Cruz, CA (US); Yun Fu, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/019,931

(22) Filed: Sep. 6, 2013

(65) Prior Publication Data

US 2014/0006422 A1 Jan. 2, 2014

Related U.S. Application Data

(63) Continuation of application No. 12/499,040, filed on Jul. 7, 2009, now Pat. No. 8,533,202.

(51) Int. Cl.
*G06F 17/30* (2006.01)
*G06Q 10/10* (2012.01)
*G06Q 30/02* (2012.01)
*G06Q 50/00* (2012.01)

(52) U.S. Cl.
CPC ...... *G06F 17/3053* (2013.01); *G06F 17/30979* (2013.01); *G06Q 10/10* (2013.01); *G06Q 30/02* (2013.01); *G06Q 50/01* (2013.01)

(58) Field of Classification Search
USPC ................................. 707/748, 749
See application file for complete search history.

(56) References Cited

U.S. PATENT DOCUMENTS

| | | |
|---|---|---|
| 5,179,654 A | 1/1993 | Richards et al. |
| 5,982,369 A | 11/1999 | Sciammarella et al. |
| 6,453,404 B1 * | 9/2002 | Bereznyi et al. ............ 711/171 |
| 6,526,440 B1 | 2/2003 | Bharat |
| 6,636,854 B2 | 10/2003 | Dutta et al. |
| 6,839,702 B1 | 1/2005 | Patel et al. |
| 6,947,930 B2 | 9/2005 | Anick et al. |
| 7,152,065 B2 | 12/2006 | Behrens et al. |
| 2002/0151327 A1 | 10/2002 | Levitt |
| 2004/0078213 A1 | 4/2004 | Brice et al. |
| 2004/0220944 A1 | 11/2004 | Behrens et al. |
| 2005/0038775 A1 | 2/2005 | Haveliwala et al. |
| 2005/0246328 A1 | 11/2005 | Zhang et al. |
| 2006/0026013 A1 | 2/2006 | Kraft |

(Continued)

OTHER PUBLICATIONS

"Ajax (programming)" downloaded Jul. 14, 2006 http://en.wikipedia.org/wiki/AJAX (4 pages).

(Continued)

*Primary Examiner* — Alex Gofman
(74) *Attorney, Agent, or Firm* — Hickman Palermo Becker Bingham LLP

(57) ABSTRACT

Techniques are provided for selecting a diverse mix of content items that may be displayed to a user. Content items such as user-generated events are received from a variety of sources. One or more content items are added to a set of content items based on a diversity of characteristics. The diversity of characteristics for the one or more content items may be calculated by measuring a diversity of characteristics of the set as if the one or more content items were added to the set. Content items that produce a greater diversity are selected for addition to the set. The set is displayed to the user, who is provided with a more meaningful mix of content due to the greater diversity in content.

20 Claims, 5 Drawing Sheets

(56) References Cited

U.S. PATENT DOCUMENTS

| | | |
|---|---|---|
| 2006/0117002 A1 | 6/2006 | Swen |
| 2006/0224624 A1 | 10/2006 | Korn et al. |
| 2007/0118498 A1* | 5/2007 | Song et al. ............... 707/1 |
| 2007/0192293 A1 | 8/2007 | Swen |
| 2007/0294225 A1 | 12/2007 | Radlinski et al. |
| 2008/0010615 A1 | 1/2008 | Curtis et al. |
| 2008/0072145 A1 | 3/2008 | Blanchard et al. |
| 2008/0154878 A1 | 6/2008 | Rose et al. |
| 2008/0319943 A1* | 12/2008 | Fischer ............... 707/3 |
| 2009/0144392 A1 | 6/2009 | Wang et al. |
| 2009/0157668 A1* | 6/2009 | Newton et al. ............... 707/5 |
| 2011/0208822 A1 | 8/2011 | Rathod |

OTHER PUBLICATIONS

"Berry Talks! Common Sense for Uncommon Times" downloaded Jul. 27, 2006 http://www.edithere.com/barry/2006/05/09 (2 pages).

Rose, D. et al., "Understanding User Goals in Web Search" (7 pages).

Wei, C., "AJAX: Asynchronous Java + XML?" (2005) downloaded Jul. 14, 2006 http://www.developer.com/design/print.php/3526681 (11 pages).

Zhang, "Improving Web Search Results Using Graph", dated Aug. 19, 2005, 8 pages.

Brenner, "Planning a Search Strategy", dated 2003, 3 pages.

Delft University of Technology, "Glossary", dated 2007, 7 pages.

Franklin, "How Search Engines Work", dated Feb. 28, 2006, 6 pages.

Taiwan Intellectual Property Office, "Office Action" in application No. 100129176, dated May 23, 2014, 4 pages.

Current Claims in application No. 100129176, dated May 2014, 9 pages.

U.S. Appl. No. 12/861,936, filed Aug. 24, 2010, Office Action.

* cited by examiner

ENTROPY-BASED MIXING AND PERSONALIZATION

BENEFIT CLAIM

This application claims benefit and priority under 35 U.S.C. §120 as a Continuation of application Ser. No. 12/499,040, filed Jul. 7, 2009, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to selecting content from a plurality of sources.

BACKGROUND

Online service providers generally provide content via the Internet to a browser on a computing device such as a personal computer used by a human user. Some online service providers, such as Facebook® and Myspace®, offer social networking sites that display several forms of user-generated events. For example, social networking sites typically display pictures, comments, notes, status updates, songs, videos, and more.

The content on social networking sites is typically generated by end-users that utilize the online service in order to share content and connect with others. Other online service providers, such as the news sites of CNN® and ESPN®, employ writers who generate the content that is distributed on the site. Still other online service providers, such as Yahoo!® and Google®, offer search services to direct users to content, some of which may be generated by other online service providers. For example, a user may use Yahoo!® search to search for "baseball scores." The user may be provided with search results that include baseball scores provided by Yahoo!® Sports and/or baseball scores provided by ESPN®.

Content generated for a particular user may be called individualized content. For practical and economic reasons, the order and selection of individualized content may be automated. For example, search providers rank search results based on the frequency by which previous users clicked on the results when submitting a similar query. Social networking sites display events in the order that they occurred.

Some online service providers employ producers to manage the display of content on the site. However, human producers may be impractical for sites that provide individualized content for thousands or millions of users. Also, many human producers are biased towards a particular type of content, and the producers make selections either based on personal preferences or based on what they perceive to be the preferences of their most valued users.

Online service providers generally use computer-implemented techniques for automatically selecting either the latest content, or the content that is perceived to be the most relevant content based upon statistical norms. According to current techniques, users that differ from the statistical norm are commonly not presented with any desired content. Further, users are often bombarded with content that is associated with a few other users who most recently used the service. In some instances, the entire screen may be filled with content related to another user who recently uploaded a popular photo album or wrote a popular note.

Unless a user is seeking the most popular content, the current techniques for selecting content frequently leave users unsatisfied. Moreover, the current techniques often convey only a very limited amount of information on the screen to the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for generating a diverse mix of content items that may be displayed to a user. Various embodiments provide a diverse mix of user-generated events such as new comments, notes, bookmarks, links, photos, and status updates. Providing a diverse mix of content to the user provides the user with more meaningful choices of which content to explore. For example, instead of providing the user with the latest ten status updates from Facebook®, various techniques discussed herein would favor displaying a recent link, a recent note, a recent photo, a few recent comments, and a few recent status updates. A new method of content selection is disclosed that is based on a computed diversity score for events, providing a content mix that is more than just a collection of the most statistically relevant items or the most recent items.

Mixing Content Items

Content items are selected based on a diversity of characteristics to produce a diverse set of content items that can be displayed to a user. Optionally, content items may be added to an initial set of content items. For example, the content items may be added using content selection techniques that involve selecting the most relevant, most popular, or most recent item to add to the initial set of content items. Then, one or more content items are added to the initial set based on a diversity of characteristics. One way to measure the diversity of characteristics for a content item is to compute the diversity score for characteristics of the initial set as if the content item was added to the initial set. Content items that produce a greater diversity of characteristics are selected for addition to the initial set of content items. For example, if the initial set of content items includes one content item from source A and two content items from source B, then one embodiment would cause content from another source C to be selected for addition to the initial set instead of more content from source B. In the example, when the set is displayed to the user, the user is provided with content from sources A, B, and C instead of just content from sources A and B. Therefore, the user is provided with a more meaningful mix of content due to the greater diversity of content.

Figure 1:
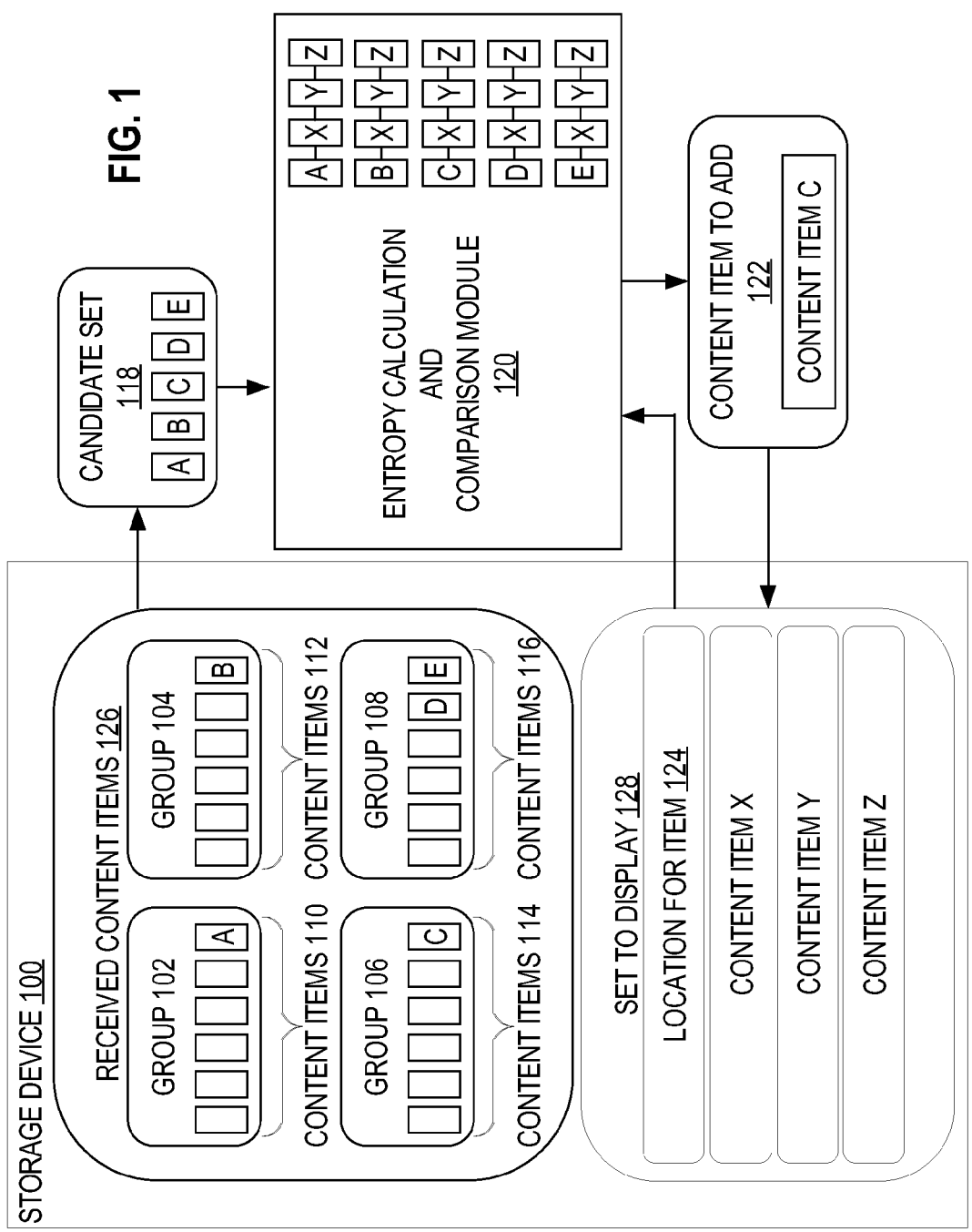
FIG. 1 is a diagram that illustrates a system for adding a content item to a set of content items to display.

FIG. 1 illustrates a system for mixing content items. As shown, received content items 126 are stored on a storage device 100. In one example, storage device 100 is on the computer of a user who is using an online service for viewing content. In another example, storage device 100 is on a server of an online service provider that provides content. In yet another example, storage device 100 represents a storage that is distributed among multiple computers over a network.

As shown, received content items 126 include four groups 102, 104, 106, and 108 of content items. Group 102 contains content items 110 that include content item A. Group 104 contains content items 112 that include content item B. Group 106 contains content items 114 that include content item C. Group 108 contains content items 116 that include content items D and E. In one embodiment, the groups may be filtered and sorted as the content items are received. Here, the groups have been sorted by time with the most recently generated content appearing on the right and the oldest content appearing on the left. In a particular embodiment, older content is removed from the groups as newer content is added to the group.

Candidate set 118 is generated by selecting one item from each of groups 102, 104, and 106, and two items from group 108. Candidate sets are discussed in greater detail in the section entitled "Candidate Sets." Although candidate sets are used in one embodiment, candidate sets are not required. A person of ordinary skill in the art would know of several ways to filter, sort, and select received content items. In one embodiment not shown, entropy calculation and comparison module 120 calculates entropy for all or a portion of received content items 126 based on any combination of filtering, sorting, and/or selecting received content items 126.

As shown, entropy calculation and comparison module 120 receives candidate set 118 and calculates entropy, or diversity of characteristics, for each item in the candidate set. For example, entropy calculation and comparison module calculates the entropy for a first item A by calculating the diversity of characteristics contained in the set of A, X, Y, and Z, where X, Y, and Z are already stored in set to display 128. The entropy for each item is compared to determine one or more items to add to set to display.

As shown, entropy calculation and comparison module 120 selects content item to add 122, which is content item C. Content item C is added to set to display 128 in location for item 124. Set to display 128 may be displayed to a user at any time. For example, after content item C is added, set to display 128 may be displayed to a user in a browser or using any suitable technique for displaying content to a user. When set to display 128 is displayed, location for item 124 may be at the top or bottom of the screen, or may vary based on one or more characteristics associated with the items in set to display 128. For example, items may be sorted by the time in which they are added to set to display 128, by the time received in received content items 126, or by some other characteristic associated with the items.

Figure 2:
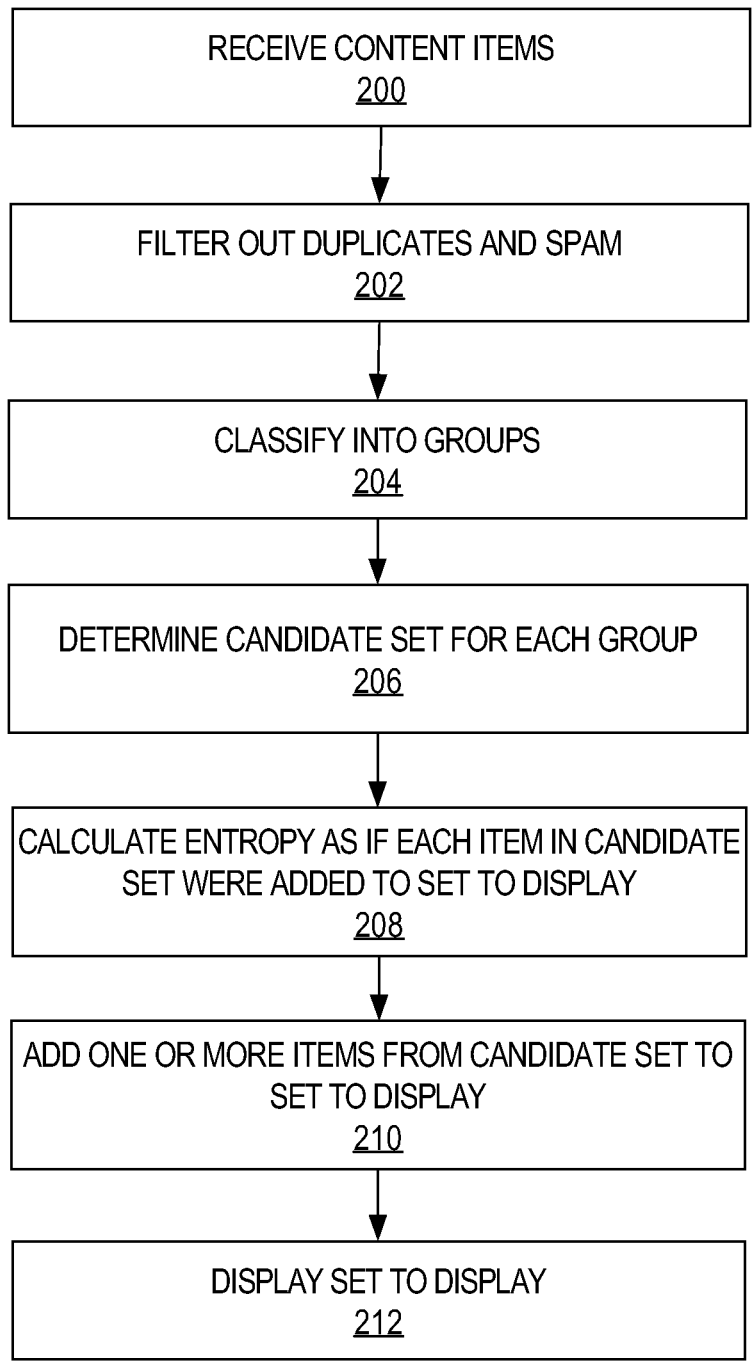
FIG. 2 is a flow chart that illustrates a process for adding a content item to a set of content items to display.

FIG. 2 illustrates one process for mixing content. In step 200, content items are received from multiple sources. In one example, content items are received from Facebook® and Digg®. Duplicates and spam are filtered out of received content items 126 in step 202. Step 202 may also include other abuse mitigation and quality assessment measures.

Content items are classified into groups in step 204. In the example provided above, content items may be classified into a Facebook® group and a Digg® group. In one embodiment, the most recent items from each group are selected to form candidate set 118, in step 206.

In step 208, entropy calculation and comparison module 120 calculates entropy as if each item in candidate set 118 were added to set to display 128. The results are used to add one or more items from candidate set 118 to set to display 128, as provided in step 210. For example, one item from Facebook® and one item from Digg® may be added to set to display 128. Set to display 128 may be displayed, step 212, to reflect the one or more items added from candidate set 118.

Sources and Content Items

The terms "sources" and "content items," as used herein, are intended to be given their broadest reasonable meaning. In one embodiment, sources represent sites such as social networking sites, news sites, digital media content sites, searched sites, particular users or authors, or any other source that provides content. In the same or another embodiment, the content items are user-generated events, search results, XML feed items such as news feeds, or any other type or form of information. The user-generated events may be notes, images, video clips, sound clips, comments, bookmarks, posts, blogs, entries, links, or any other type of information generated or submitted by a user.

Characteristics

Content items are selected based on diversity between one or more characteristics of the content items and one or more characteristics of the set to be displayed. In one embodiment, the characteristic is a source identifier, a user identifier or other information associated with a user or source that generated the content. In the same or another embodiment, the characteristic is a category, type, or other information about the content item or other data produced by a user that generated the content item. For example, the content item may be categorized as "sports" or "music" if the content item contains content about sports or music. The techniques described herein may be used with any categorization method, and the embodiments discussed are not limited to any particular categorization method.

In still other embodiments, the characteristic is a time that the content item was generated, a time that the content item was added to the set to be displayed, or any other time associated with the content item.

The characteristic may be transmitted with the content item, determined from the content item, or transmitted separately from the content item. For example, the content item may store information that indicates that the content item is from Twitter®. In another example, the content item may contain one or more keywords or concepts that cause the content item to be categorized into a particular category. In yet another example, a category for the content item may be transmitted separately from the content item.

Candidate Sets

In one embodiment, a first content item and a second content item are added to a candidate set of content items for which a diversity of content is measured. As used herein, a "bucket" is a particular type of a group in which items may be dropped. In a particular embodiment, the first content item may be selected from items in a first bucket of content items having a first value of a particular characteristic, and the second content item may be selected from candidate items in a second bucket of content items having a second, different value of the particular characteristic. For example, the first content item may be selected from the first bucket that represents content items from Digg®, and the second item may be selected from the second bucket that represents other content items. In another example, the first bucket may represent content items associated with sports, and the second bucket may represent content items associated with music.

In a particular system, incoming content items are filtered and placed into buckets as they are received. The incoming content items may be filtered by removing spam and duplicate content items. In one example, particular keywords detected in content items cause the content items to be removed from the set of incoming items. A candidate set may be formed by selecting content items from each bucket. The items added to the candidate set from each bucket may be determined based on the age of the items in the bucket. For example, the candidate set may include the most recent five items in a first bucket. In other embodiments, items are selected from each bucket based on other characteristics associated with the items. In one embodiment, some buckets contribute more content items to the candidate set than other buckets. Optionally, the system may be calibrated to increase or decrease the amount items that are selected from a Digg® bucket based on whether items from the Digg® bucket are statistically more or less likely to be selected from the candidate set.

Optionally, the system maintains global statistics about the number of items that have already been shown from each of the buckets, the number of items that have been clicked from each of the buckets, and user preferences with respect to the buckets. In one embodiment, recent statistics, corresponding to items added within a certain time period, are maintained. For example, last week, ten Digg® items and one Facebook® item were shown to a particular user. The number of Facebook® items may be increased as a corrective measure in order to promote diversity of items to be displayed for the next week. In another embodiment, statistics are maintained without respect to time for a particular user. The statistics may indicate that the particular user has clicked on a Facebook® items more frequently than Digg® items, and the system may be configured to adapt to usage statistics by increasing the amount of items displayed from Facebook®.

In yet another embodiment, the statistics are combined with user preferences in order to determine how many items are selected from each bucket. User preferences may be entered into the system and modified by a user, by an administrator, or by the system based on click log statistics for the user. User preferences entered by a user may be accomplished through a user interface to the system, for example, a graphical user interface displayed to the user in a browser. In one example, user preferences indicate that a user prefers to see more Digg® items than Facebook® items. For the user, more items may be selected for display from the Digg® bucket than from the Facebook® bucket. User preferences may also indicate that another user prefers to see more Facebook® items than Digg® items. For the other user, more items may be selected for display from the Facebook® bucket than from the Digg® bucket.

In a specific example, a user may store a preference indicating that the user is an avid sports fan. In one embodiment, incoming events are separated into buckets based on content. A large amount of items are selected from the "sports" bucket, and a small amount of items are selected from all other buckets. The items are displayed to the user in a manner that promotes a high diversity of characteristics within the bounds of the user preferences. In another embodiment, incoming events are separated into buckets based on source. The buckets are sorted based on content, and sports items are selected from each bucket. In the other embodiment, the items are also displayed in a manner that promotes a high diversity of characteristics within the bounds of the user preferences.

The statistics provide important information to the system that may be used to trigger changes in the techniques used to select items. If an insufficient amount of diversity is achieved based on a current technique of selecting items, then the current technique may be modified by the system automatically in order to promote a greater diversity in items to be displayed. Further, if user preferences are not being met by a current technique, then the current technique may be modified in order to better accomplish the user preferences. For example, the current technique may be modified to decrease the number of items selected from one bucket and increase the number of items selected from another bucket.

In a particular system, a content item may be selected for a candidate set based on a likelihood that the content item is to increase a diversity of characteristics among a set of content items, without regard to the actual characteristics of the set of items. For example, the content item may be associated with several categories such as "sports," "movies," and "celebrities," and another content item may be associated with only "sports," or only "sports" and "awards." Because the content item associated with three categories is associated with more values of characteristics than the other content item, the content item associated with three categories is more likely to produce a greater diversity among a set of content items. The content item in three categories may be determined to produce a greater diversity without knowledge of the actual characteristics of the set of content items and without calculating diversity as if the content item was in the set to be displayed.

In one embodiment, buckets hold items of a certain type of content. For example, one bucket is an image bucket, and another bucket is a comment bucket. In another example, a bucket may include content items with several values of characteristics or a range of values of characteristics so that multiple items of different values are grouped in the same bucket.

Calculating Diversity of Characteristics

The diversity of characteristics is calculated for the content items from, for example, the candidate set of content items. In one embodiment, the diversity of characteristics for a content item from the candidate set may be calculated by determining the diversity of characteristics in a combination of characteristics of the content item and characteristics of the set of content items to be displayed.

In one embodiment, a diversity of characteristics is calculated for each content item in the candidate set. Optionally, the results of the diversity of characteristics calculations are compared before the content items are added to the set of content items to be displayed. In one embodiment, a particular content item with a highest calculated diversity of characteristics is selected from the candidate set to be added to the set of items to be displayed. In other embodiments, the desired level of diversity may be configured by a user or administrator. The particular content item is selected to produce a greatest possible diversity of content with the set of content items to be displayed. In another embodiment, content items are added that would produce a diversity of content above a threshold diversity of content.

Various calculations may be used to ensure a diversity of characteristics in a set of content items, and the techniques are not intended to be limited to any particular method of calculating diversity. In one embodiment, the diversity calculation maximizes source entropy by favoring content items associated with a source characteristic that is not already represented in the set. For example, a Twitter® event would be selected over a Facebook® event when the set is already overrun by Facebook® events but has few or no Twitter® events.

In another embodiment, the diversity calculation maximizes user entropy by favoring content items associated with a user characteristic that is not already represented in the set. For example, a comment from Suzy would be added to a set that contains events generated by John and Joe but not Suzy.

In another embodiment, the diversity calculation maximizes content entropy by favoring content items associated with a particular type, category, or keyword, optionally based on information stored in the content item and generated by a source user, that are not already represented in the set. For example, a note such as "Transformers was okay" might be categorized as "movie," and a note about "Kobe" might be categorized as "sports." The movie note and not the sports note would be added to a set that already contains notes about sports but does not already contain notes about movies.

In one embodiment, the diversity of a characteristic of a set with n unique characteristic values is calculated based on the following equation, where $p_i$ is the number of items that share the value divided by the total number of items:

$$-\Sigma_{i=1}^{n} p_i \log(p_i)$$

For example, in a set of items with three items from Facebook®, three items from Twitter®, one item from Digg®, and one item from Myspace®, the diversity score of the source characteristic is:

$$-\tfrac{3}{8} \log(\tfrac{3}{8}) - \tfrac{3}{8} \log(\tfrac{3}{8}) - \tfrac{1}{8} \log(\tfrac{1}{8}) - \tfrac{1}{8} \log(\tfrac{1}{8}) \approx 0.545$$

In one embodiment, multiple diversity scores are calculated for multiple characteristics of items. In a particular embodiment, the multiple diversity scores for each item are stored as a vector. For example, a first item may be associated with a user characteristic diversity score $U_1$, a source characteristic diversity score $S_1$, and a content characteristic diversity score $C_1$. Similarly, a second item is associated with $U_2$, $S_2$, and $C_2$.

In one embodiment, the longest vector is selected to be added to the set. In another embodiment, the scores are compared individually, $U_1$ to $U_2$, $S_1$ to $S_2$, and $C_1$ to $C_2$. The item with a higher diversity score on the most dimensions is selected to be added to the set.

Weighing Diversity of a Particular Characteristic

Particular characteristics may be given a certain weight. For example, based on user preferences, a diversity of users may be more important than a diversity of source sites. In the example, a diversity of users could be given more weight than the diversity of source sites. When calculating the diversity of characteristics, the diversity of users would contribute more to the diversity of characteristics than would the diversity of sites, causing a greater diversity of users in the set of content items to be displayed. In a specific example, a set of items to display may contain a content item from user X of source A and user Y of source A. An item from user Z of source A may be added to the set to display instead of an item from user Y of source B, based on the weight given to diversity of users and the fact that user Y already has an item in the set to display. The weight may be added into the diversity score as a multiplier of the characteristic to which the weight is associated. In the example, the user diversity scores are multiplied by three, causing user diversity to dominate the mixing process.

In one embodiment, the weight for characteristics may be set by a user. For example, a user may prefer a greater diversity of sources rather than a greater diversity of users. In another embodiment, the weight for characteristics may be set by the system based on other information such as user preferences or usage information from click logs. Based on usage information, the system may detect that a user generally clicks on a wide variety of sources from a wide variety of users, indicating that the user prefers a high diversity of sources and users. The system may also detect that the user generally clicks only on a narrow scope of content. Thus, a high score in content diversity would actually display more items that the user is disinterested in rather than more items tailored to the interests of the user. In the example, the system could maintain a high weight of diversity for users and sources while lowering a weight of diversity for content. In other words, a user preferring sports content may prefer a low diversity in content as long as the items are related to sports. The user may prefer a high diversity of sources and users in order to get a variety of viewpoints on the same topic.

At any time, a same value for a characteristic may be detected in several content items of the set to be displayed. In one embodiment, a weight for the characteristic may be raised in response to detecting that over a certain number of content items share the same value for the characteristic. In another embodiment, the weight for the characteristic may be lowered in response to detecting that under a certain number of content items share the same value for the characteristic.

Figure 4:
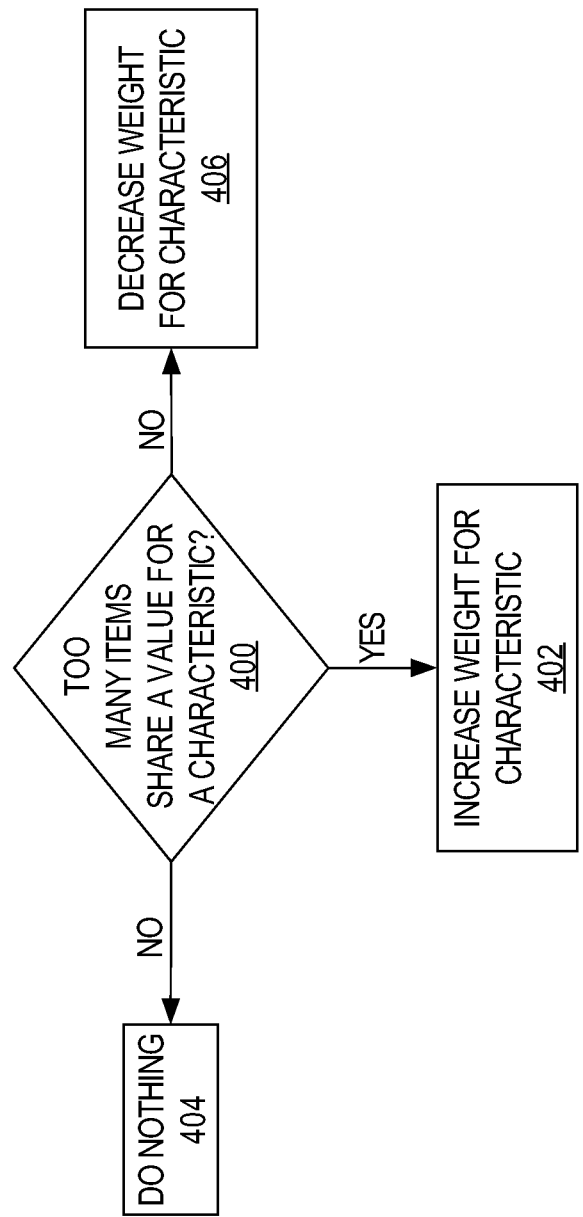
FIG. 4 is a decision model illustrating a process for determining whether to modify the weight for a characteristic of a content item.

As shown in FIG. 4, a determination, 400, may be made as to whether too many items in a set share a value for a characteristic. For example, the set to be displayed may contain too many Digg® events. If too many items share a value for the characteristic, then a weight, 402, may be increased for the characteristic. The weight may be increased in order to place a higher value on diversity of the characteristic, to promote a greater diversity among items with respect to the characteristic. If there is already a good amount of diversity in the set to display, then either a weight may be decreased for a characteristic, 406, or no changes are made to the mixing system, 404.

Removing Content Items from Sets

As content items are added to the set of content items to be displayed, content items may be removed from the secondary set of content items and/or the set of content items to be displayed. In one embodiment, items are removed from the sets based on how long the items have been in the sets. In another embodiment, items are removed based on the age of the item from its time of creation. In yet another embodiment, items may be removed from the sets based on any other characteristics associated with the items. Optionally, duplicative content may be detected and removed from the sets.

Figure 3:
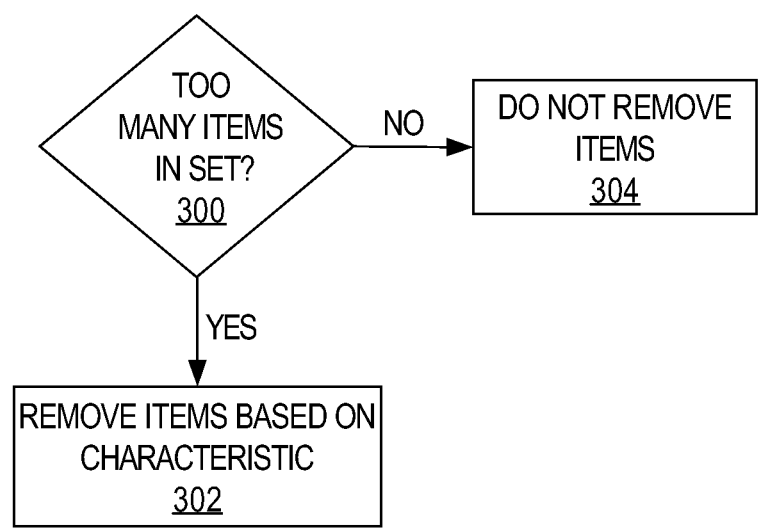
FIG. 3 is a decision model illustrating a process for determining whether to remove items from a set of content items.

As shown in FIG. 3, a determination, 300, may be made as to whether there are too many items in a set, such as a candidate set or a set to display. If there are too many items in the set, then items may be removed, 302, from the set based on one or more characteristics such as the time in which the item was added to the set. If there are not too many items in the set, then, in one embodiment, items are not removed, 304, from the set.

Displaying Content Items

At any time, a set of items may be displayed to the user. The set of items may be modified as the set is displayed, and the user may be provided with an update of the set of items. In one embodiment, the set of items is sorted based on a characteristic. For example, the set of items may be sorted based on search relevance or based on the length of time for which items have been in the set of items. In one embodiment, items that were created earlier appear at the bottom of the screen, and items that were created later appear at the top of the screen. In a particular embodiment, a set of content items is sent from a content server to a user. For example, the content items are provided in response to a login, request, or query submitted by the user. In another example, the content items are associated with information about the user, such as content items from friends in a social network. In yet another example, the content items are provided as XML feeds to which the user subscribed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
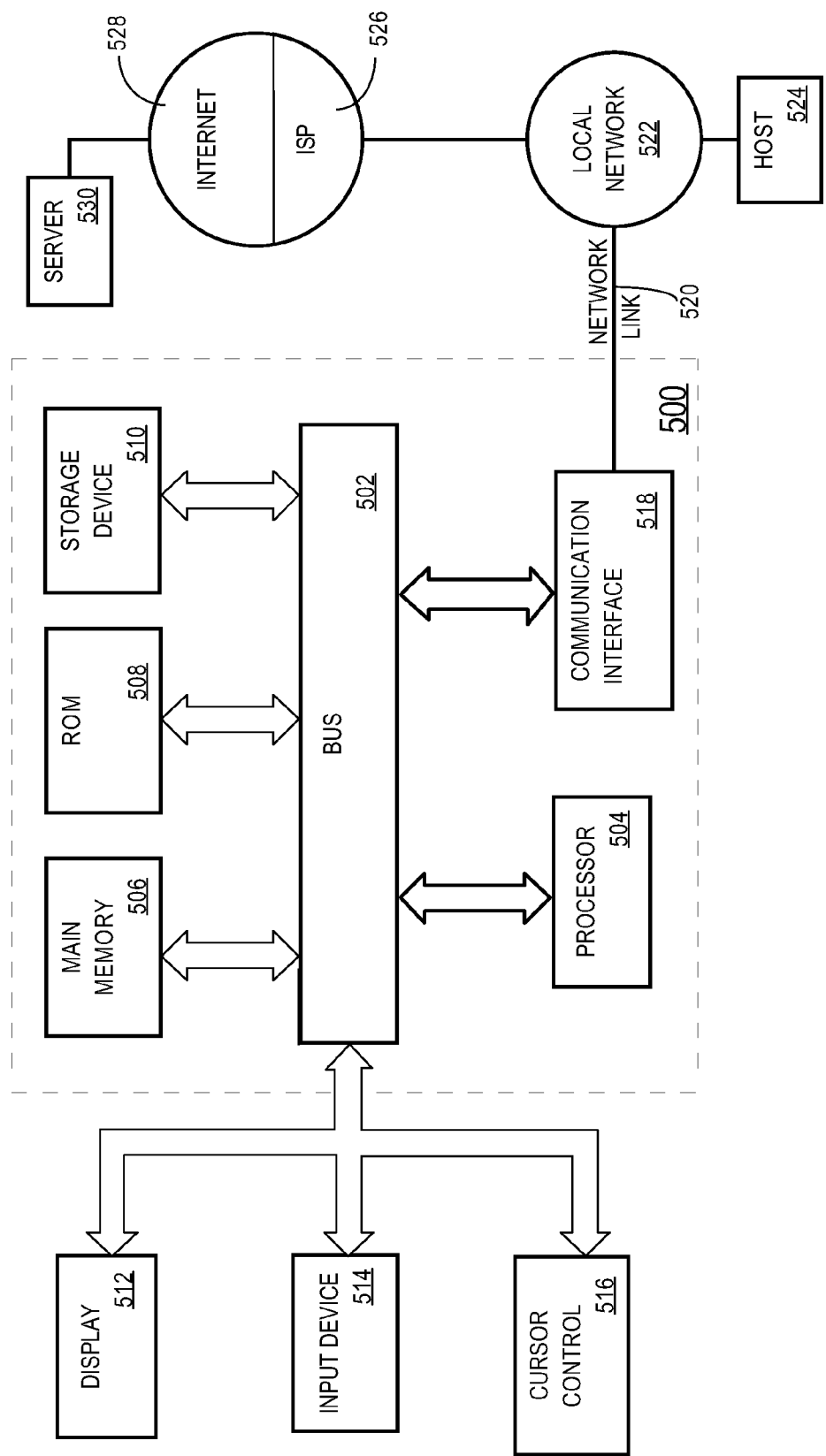
FIG. 5 is a diagram that illustrates a computer system that can be used for mixing content items.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method in a computer system for selecting a content item to present to a user, the method comprising:
    obtaining a set of a plurality of content items already presented to the user;
    removing at least one content item from the set of content items already presented to the user to select a subset of one or more already presented content items to be presented again to the user;
    receiving a plurality of content items not yet presented to the user, each generated at one of a plurality of different sources;
    classifying each of the received content items into one or more of a plurality of groups of content items based at least on the source of the plurality of sources at which the content item is generated;
    selecting a candidate set of a plurality of content items from the groups of classified content items;
    for each content item in the candidate set of content items, computing a diversity score for each of one or more characteristics of the candidate content item, wherein the diversity score is a function of the number of content items in the subset of already presented content items selected to be presented again to the user that share the characteristic with the candidate content item;
    based on the diversity scores computed for each content item in the candidate set of content items, selecting one of the content items in the candidate set of content items to present to the user that, relative to the other content items in the candidate set of content items, maximizes entropy with the subset of already presented content items selected to be presented again to the user; and
    presenting, to the user, the selected content item and the subset of already presented content items.

2. The method of claim 1, further comprising classifying each of the received content items into one or more groups of content items based at least on a type of the content item.

3. The method of claim 1, further comprising selecting the candidate set of the plurality of content items from the groups of classified content items according to user specified preferences.

4. The method of claim 1, further comprising selecting the candidate set of the plurality of content items from the groups of classified content items based at least on data representing number of past selections of candidate content items from the groups of classified content items by source.

5. The method of claim 1, further comprising:
    for each content item in the candidate set of content items, computing a diversity score for each of a plurality of characteristics of the candidate content item, wherein the diversity score is a function of the number of content items in the subset of already presented content items selected to be presented again to the user that share the characteristic with the candidate content item;
    for each content item in the candidate set of content items, computing an overall diversity score based on a combination of the diversity scores computed for the content item;
    based on the overall diversity scores computed for each content item in the candidate set of content items, selecting one of the content items in the candidate set of content items to present to the user that, relative to the other content items in the candidate set of content items, maximizes entropy with the subset of already presented content items selected to be presented again to the user.

6. A method in a computer system for selecting a content item to present to a user, the method comprising:
    obtaining a set of a plurality of content items already presented to the user;

removing at least one content item from the set of content items already presented to the user to select a subset of one or more already presented content items to be presented again to the user;

receiving a plurality of content items not yet presented to the user, each being one of a plurality of different types;

classifying each of the received content items into one or more of a plurality of groups of content items based at least on the type of the content item;

selecting a candidate set of a plurality of content items from the groups of classified content items;

for each content item in the candidate set of content items, computing a diversity score for each of one or more characteristics of the candidate content item, wherein the diversity score is a function of the number of content items in the subset of already presented content items selected to be presented again to the user that share the characteristic with the candidate content item;

based on the diversity scores computed for each content item in the candidate set of content items, selecting one of the content items in the candidate set of content items to present to the user that, relative to the other content items in the candidate set of content items, maximizes entropy with the subset of already presented content items selected to be presented again to the user; and presenting, to the user, the selected content item and the subset of already presented content items.

7. The method of claim 6, further comprising classifying each of the received content items into one or more groups of content items based at least on a source of the content item.

8. The method of claim 6, further comprising selecting the candidate set of the plurality of content items from the groups of classified content items according to user specified preferences.

9. The method of claim 6, further comprising selecting the candidate set of the plurality of content items from the groups of classified content items based at least on data representing number of past selections of candidate content items from the groups of classified content items by type.

10. The media of claim 6, the method further comprising the steps of:

for each content item in the candidate set of content items, computing a diversity score for each of a plurality of characteristics of the candidate content item, wherein the diversity score is a function of the number of content items in the subset of already presented content items selected to be presented again to the user that share the characteristic with the candidate content item;

for each content item in the candidate set of content items, computing an overall diversity score based on a combination of the diversity scores computed for the content item;

based on the overall diversity scores computed for each content item in the candidate set of content items, selecting one of the content items in the candidate set of content items to present to the user that, relative to the other content items in the candidate set of content items, maximizes entropy with the subset of already presented content items selected to be presented again to the user.

11. One or more non-transitory computer-readable media storing instructions which, when executed by one or more computing devices, cause performance by the one or more computing devices of a method for selecting a content item to present to a user, the method comprising the steps of:

obtaining a set of a plurality of content items already presented to the user;

removing at least one content item from the set of content items already presented to the user to select a subset of one or more already presented content items to be presented again to the user;

receiving a plurality of content items not yet presented to the user, each generated at one of a plurality of different sources;

classifying each of the received content items into one or more of a plurality of groups of content items based at least on the source of the plurality of sources at which the content item is generated;

selecting a candidate set of a plurality of content items from the groups of classified content items;

for each content item in the candidate set of content items, computing a diversity score for each of one or more characteristics of the candidate content item, wherein the diversity score is a function of the number of content items in the subset of already presented content items selected to be presented again to the user that share the characteristic with the candidate content item;

based on the diversity scores computed for each content item in the candidate set of content items, selecting one of the content items in the candidate set of content items to present to the user that, relative to the other content items in the candidate set of content items, maximizes entropy with the subset of already presented content items selected to be presented again to the user; and presenting, to the user, the selected content item and the subset of already presented content items.

12. The media of claim 11, the method further comprising classifying each of the received content items into one or more groups of content items based at least on a type of the content item.

13. The media of claim 11, the method further comprising selecting the candidate set of the plurality of content items from the groups of classified content items according to user specified preferences.

14. The media of claim 11, the method further comprising selecting the candidate set of the plurality of content items from the groups of classified content items based at least on data representing number of past selections of candidate content items from the groups of classified content items by source.

15. The method of claim 11, further comprising:

for each content item in the candidate set of content items, computing a diversity score for each of a plurality of characteristics of the candidate content item, wherein the diversity score is a function of the number of content items in the subset of already presented content items selected to be presented again to the user that share the characteristic with the candidate content item;

for each content item in the candidate set of content items, computing an overall diversity score based on a combination of the diversity scores computed for the content item;

based on the overall diversity scores computed for each content item in the candidate set of content items, selecting one of the content items in the candidate set of content items to present to the user that, relative to the other content items in the candidate set of content items, maximizes entropy with the subset of already presented content items selected to be presented again to the user.

16. One or more non-transitory computer-readable media storing instructions which, when executed by one or more computing device, cause performance by the one or more computing devices of a method for selecting a content item to present to a user, the method comprising the steps of:

obtaining a set of a plurality of content items already presented to the user;

removing at least one content item from the set of content items already presented to the user to select a subset of one or more already presented content items to be presented again to the user;

receiving a plurality of content items not yet presented to the user, each being one of a plurality of different types;

classifying each of the received content items into one or more of a plurality of groups of content items based at least on the type of the content item;

selecting a candidate set of a plurality of content items from the groups of classified content items;

for each content item in the candidate set of content items, computing a diversity score for each of one or more characteristics of the candidate content item, wherein the diversity score is a function of the number of content items in the subset of already presented content items selected to be presented again to the user that share the characteristic with the candidate content item;

based on the diversity scores computed for each content item in the candidate set of content items, selecting one of the content items in the candidate set of content items to present to the user that, relative to the other content items in the candidate set of content items, maximizes entropy with the subset of already presented content items selected to be presented again to the user; and presenting, to the user, the selected content item and the subset of already presented content items.

17. The media of claim 16, the method further comprising classifying each of the received content items into one or more groups of content items based at least on a source of the content item.

18. The media of claim 16, the method further comprising selecting the candidate set of the plurality of content items from the groups of classified content items according to user specified preferences.

19. The media of claim 16, the method further comprising selecting the candidate set of the plurality of content items from the groups of classified content items based at least on data representing number of past selections of candidate content items from the groups of classified content items by type.

20. The media of claim 16, the method further comprising the steps of:

for each content item in the candidate set of content items, computing a diversity score for each of a plurality of characteristics of the candidate content item, wherein the diversity score is a function of the number of content items in the subset of already presented content items selected to be presented again to the user that share the characteristic with the candidate content item;

for each content item in the candidate set of content items, computing an overall diversity score based on a combination of the diversity scores computed for the content item;

based on the overall diversity scores computed for each content item in the candidate set of content items, selecting one of the content items in the candidate set of content items to present to the user that, relative to the other content items in the candidate set of content items, maximizes entropy with the subset of already presented content items selected to be presented again to the user.

\* \* \* \* \*